Oct. 13, 1970 G. V. RAO ET AL 3,534,163
TELEVISION LINE SELECTION SYSTEM FOR SELECTING
A PREDETERMINED PULSE IN A PULSE SERIES
Filed Aug. 18, 1967 2 Sheets-Sheet 1

INVENTORS
GUTHIKONDA V. RAO
BY ALBERT Y. CHAN
AGENT

INVENTORS
GUTHIKONDA V. RAO
ALBERT Y. CHAN
BY
Frank R. Trifari
AGENT

United States Patent Office 3,534,163

Patented Oct. 13, 1970

3,534,163

TELEVISION LINE SELECTION SYSTEM FOR SELECTING A PREDETERMINED PULSE IN A PULSE SERIES

Guthikonda Virbhadra Rao, New Rochelle, N.Y., and Albert Yiu-Cheung Chan, Collingswood, N.J., assignors, by mesne assignments, to U.S. Philips Corporation, New York, N.Y., a corporation of Delaware Filed Aug. 18, 1967, Ser. No. 661,567
Int. Cl. G01r *13/20;* H03k *5/13, 5/18*
U.S. Cl. 178—6 9 Claims

ABSTRACT OF THE DISCLOSURE

A system for selecting a pulse, such as a particular horizontal pulse, when it is initiated by a vertical drive pulse in a television system. In the system, a series of horizontal pulses in a feedback loop are applied by way of a gate to a counter, until a predetermined count, at which time the gate is closed. The counter also controls a second gate to pass the selected pulse.

Figure 3:
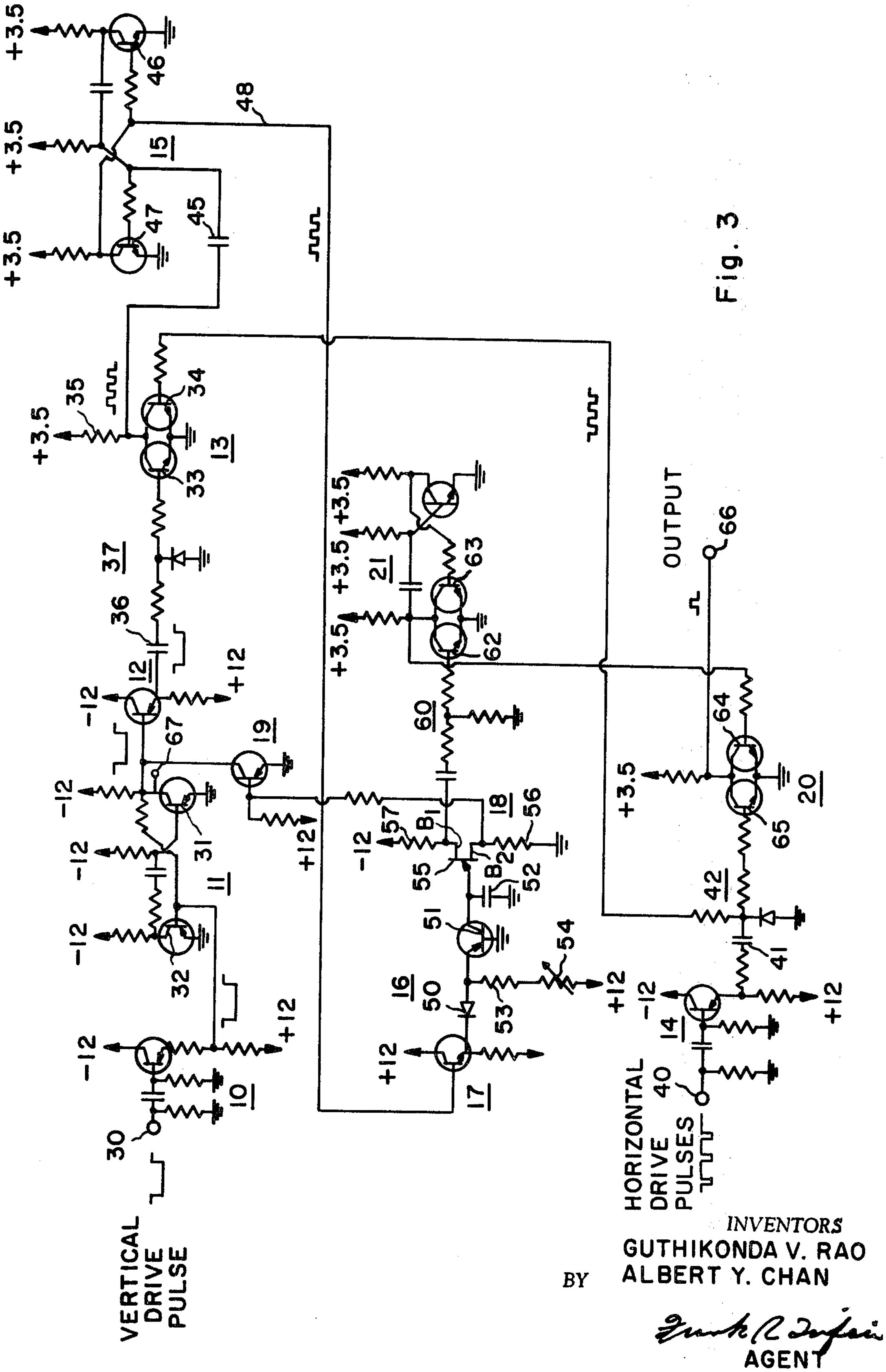

This invention relates to a system for the error-proof selection of a given pulse in a series of pulses. The invention is more particularly concerned with a system for the selection of a desired horizontal pulse in the vertical blanking period of a television signal. Systems of this type are useful, for example, in providing vertical interval test signals for network transmission, providing single line color bar test signals for color cameras, providing fixed period vertical blanking in television synchronizing signal generators without a half-line picture element at the start in field No. 2, and for providing special television effects.

In previous television systems, the selection of a desired line interval during the vertical blanking period was accomplished by employing a vertical drive pulse to initiate the generation of a broad vertical pulse. The trailing edge of the broad pulse was employed to select the desired line interval. If the broad pulse has a width of up to 19 line intervals, i.e. about 1.2 milliseconds, the duration of this pulse may be quite critical. With such a broad pulse, an error of $\pm 0.5$ percent in the pulse duration will produce a timing error of about 12 microseconds. An error above this tolerance can result in the erroneous selection of a line interval.

It is the object of this invention to provide a system for selecting a given pulse in a pulse train, the system having the advantages that non-critical circuits and components are employed, that the selection of the desired pulse is precise, and that adjustments of the system are non-critical and easy to preset.

According to one embodiment of the invention, the above object is achieved in a television system, by employing a vertical drive pulse to generate a first gate signal that is substantially wider than the sum of the line intervals preceding the desired line interval to be selected. This gate signal permits passage of a series of the horizontal pulses to a counter, by way of a pulse regenerator. The counter, upon reaching the desired count, produces an output signal for feeding back a signal to close a gate and thereby preventing the application of further pulses to the counter, and to generate a second gate signal of predetermined duration. The second gate signal is connected to a gate circuit for passing only the selected horiozntal pulse to an output circuit. With this arrangement the selection of the desired pulse is not dependent upon critical timing circuits, and the desired pulse to be selected may be easily controlled. The system also permits the production of an accurate broad vertical pulse, which may be employed for example to select a predetermined number of horizontal pulses.

Figure 1:
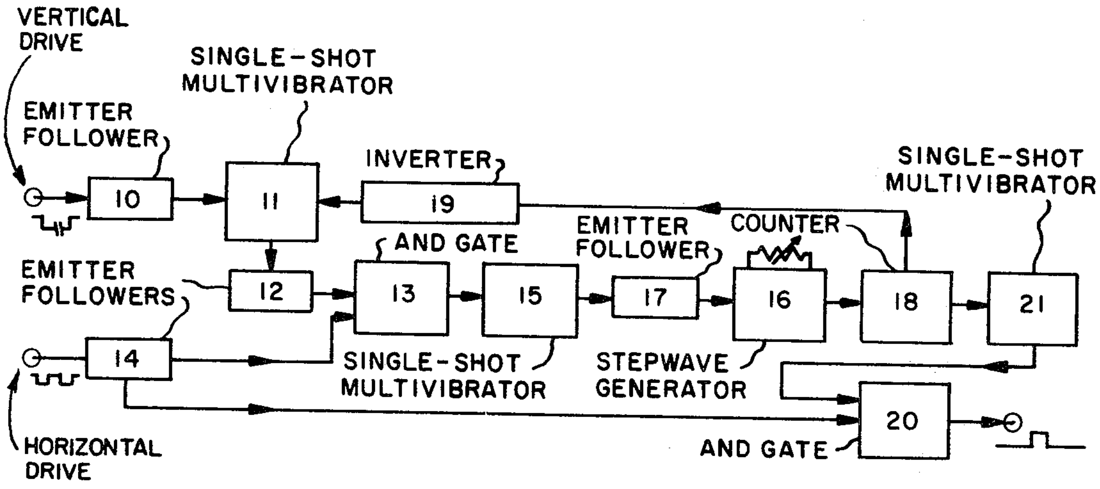
Figure 2:
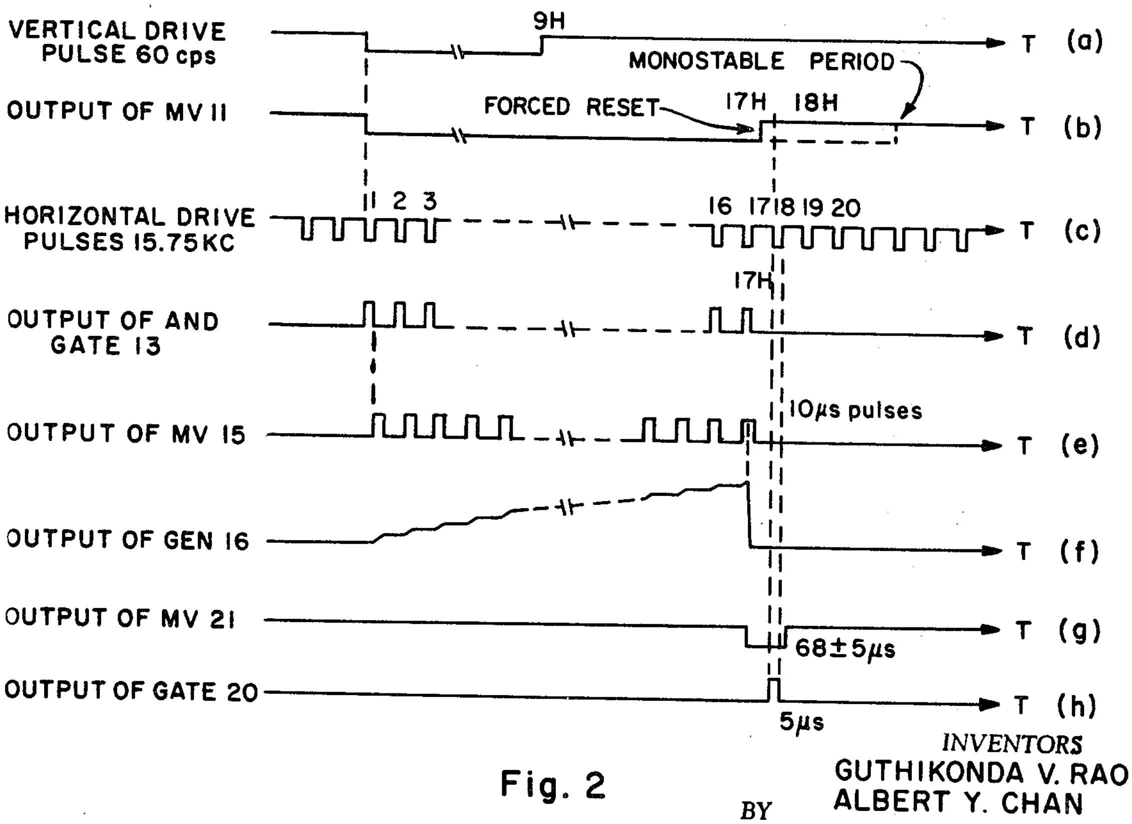

While the specification concludes with claims particularly pointing out and distinctly claiming the subject matter which we regard as our invention, it is believed that the invention will be better understood from the following description taken in connection with the accompanying drawings, in which:

FIG. 1 is a block diagram of a pulse selection system according to the invention, FIG. 2 is a diagram illustrating various waveforms which occur in the system of FIG. 1, and FIG. 3 is a circuit diagram of one embodiment of the system of FIG. 1.

Referring now to the drawing, and more in particular to FIG. 1, vertical drive pulses, such as are conventionally available or derivable in a television camera system, are applied, for example by way of an emitter follower circuit 10, to a single-shot multivibrator 11. The output of the multivibrator 11 is applied, for example by way of emitter follower 12, to one input of AND gate 13. Horizontal drive pulses, synchronized with the vertical drive pulses, are applied, for example by way of emitter follower 14, to the other input of AND gate. In the NTSC system the vertical drive pulses have a pulse repetition frequency of 60 Hz. and may have a width of about 9 line periods, and the horizontal drive pulses have a repetition frequency of 15.75 kHz. and a width of about 5 $\mu$s.

The width of the output pulse of the multivibrator 11 is preferably about 5 line intervals (5H) greater than the interval between the start of the vertical drive pulse and the horizontal pulse immediately preceding the desired horizontal pulse. For example, if it is desired to select the 18th horizontal pulse in the vertical blanking period, the output pulse of the multivibrator 11 should have a width of about 22 line periods (22H).

The trailing edge of the output pulses from the AND gate 13 are applied to a single shot multivibrator 15 in order to generate a pulse train of pulses of predetermined width, for example 10 microseconds, and these pulses are applied to a step wave generating circuit 16, for example by way of emitter follower 17. The generator 16 produces a step wave that increases a predetermined amount for every input pulse, and includes means for controlling the amplitude of the steps. The output of the generator 16 is applied to a counter circuit 18, for producing an output pulse when the step wave reaches a given level. The output pulse of the counter is applied, if necessary by way of an inverter 19, to the multivibrator 11 in order to reset this multivibrator, and also as one input to an AND circuit 20 by way of a $1-H$ gate-pulse generator 21. The output of the emitter follower 14 is also applied to the other input of AND circuit 20, and the selected horizontal drive pulse is obtained from the output of AND circuit 20.

The operation of the system of FIG. 1 may be better understood with reference to the waveforms illustrated in FIG. 2. The vertical drive pulse illustrated in FIG. 2($a$) triggers the multivibrator 11 to produce a pulse as shown in FIG. 2($b$). In the event the multivibrator 11 were not reset by the output of inverter 19, the pulse of FIG. 2(*b*) would have a width of about 22 horizontal periods, as shown in dashed lines (assuming again the example in which it is desired to select the 18th horizontal pulse). The horizontal line pulses shown in FIG. 2(*c*) are also applied to the AND gate 13, and these pulses pass the AND gate 13 during the occurrence of the pulse output of multivibrator 11 (FIG. 2(*b*)), to produce the pulse series of FIG. 2(*d*). The trailing edge of the pulse series triggers single shot multivibrator 15 to produce the new pulse series of FIG. 2(*e*). This latter pulse series is applied to the generator 16 to produce the step wave of FIG. 2(*f*). The amplitude of the steps of the step wave are controlled in the generator to reach the threshold level of the counter 18 upon the reception of the 17th pulse from AND gate 13, so that the output pulse of the counter resets the multivibrator 11 before the 18th pulse. The AND gate 13 is thereby closed and no further pulses reach the step-wave generator. The stepwave is also reset to zero, by means that will be more apparent in the following paragraphs, and the output pulse of the counter is applied to the single shot multivibrator 21. This multivibrator produces a gate pulse of a width preferably slightly exceeding the horizontal line period (FIG. 2(*g*)), for example 68±5 μs., and the pulse of FIG. 2(*g*) permits only the 18th horizontal drive pulse to pass the AND gate 20, to produce the selected horizontal pulse (FIG. 2(*h*)).

From the above description it is apparent that the selection of the desired pulse is very accurate, and does not require critical circuits components, or adjustments. Since the output pulse which passes gate 20 is dependent upon the count of counter 18, the particular pulse that is selected may be easily controlled by controlling the count at which the counter provides an output signal. The accuracy of the count is not dependent upon the production of an accurate pulse of long duration. This is of particular importance in television systems wherein the positions of the horizontal pulses with respect to the start of the vertical blanking period are different in the odd and even fields.

Referring now to the circuit diagram of FIG. 3, the vertical drive pulses are applied from input terminal 30 to the single shot multivibrator 11 by way of emitter follower 10, in order to isolate the signal source from the multivibrator. The multivibrator 11 is a conventional monostable multivibrator with a normally conducting transistor 31 and a normally cut-off transistor 32. As shown in the figure, the direct connection between the emitter follower and the base of transistor 32 can serve to apply trigger signals to transistor 32, as well as to provide a cut-off bias for this transistor by returning the emitter of the emitter follower circuit 10 to a positive source. The output of the multivibrator 11, which in this circuit is a broad negative pulse at the collector of transistor 31, is applied to emitter follower 12. This pulse, as stated above, should have a width about five line intervals greater than the interval between the start of the vertical drive pulse and the horizontal pulse immediately preceding the desired horizontal pulse.

The AND gate 13 may consist of a pair of transistors 33 and 34 with interconnected emitters and a common collector resistor 35. The output of the emitter follower 12 is applied to the base of transistor 33 by way of a capacitor 36 and a network 37 consisting of a pair of series resistors and a shunt diode. This network is a clamp circuit to hold the base of transistor 33 at ground level, and therefore to cut off the transistor, only during the occurrence of the negative pulse output from the emitter follower 12.

The horizontal drive pulses are applied from input terminal 40 to the emitter follower 14, and the output of the emitter follower is coupled by way of capacitor 41 and clamp circuit 42 to the base of the transistor 34. Due to the action of the clamp circuits 37 and 42, current will flow in the collector resistor 35 continuously except when the negative input pulses to the bases of both transistors 33 and 34 are present. Consequently, the output at the collector of transistor 34 will be a series of positive pulses coinciding with the horizontal drive pulses and occurring for a predetermined time following the start of each vertical drive pulse.

The trailing edge of the output pulses from the AND gate 13 are applied as trigger pulses through capacitor 45 to single shot multivibrator 15, which regenerates output pulses having widths of, for example, ten microseconds. In this multivibrator, as shown in the diagram, transistor 47 is inter connected to the transistor 46 in conventional manner to form a monostable multivibrator. The trigger pulses from AND gate 13 are applied through capacitor 45 to the base of transistor 47. The pulses generated by the multivibrator 15 ensure accuracy in timing.

The output of the multivibrator 15, which is a series of positive pulses on lead 48, is applied to emitter follower 17, and the output pulses from the emitter follower are applied to the stepwave generating circuit 16. The circuit 16 is comprised of a diode 50 connected between the emitter of the transistor of the emitter follower stage 17, and the emitter of a transistor 51 having a grounded base. A capacitor 52 is connected between the collector and ground. The emitter of the transistor 51 is connected by way of fixed resistor 53 and variable resistor 54 to a positive supply source.

The emitter of the transistor of emitter follower stage 17 is normally at about ground potential, since the transistor 47 is normally conducting and its collector voltage is low. The diode 50 is poled so that it conducts current through the resistors 53 and 54 when the emitter of transistor stage 17 is at this level, and consequently the drop across resistor 53 and 54 will hold transistor 51 cut off. Upon the occurrence of a positive pulse at the base of transistor stage 17, the emitter of transistor 15 will be driven positive so that it will become conductive. The ten microsecond input pulses will therefore result in a constant-current charging of capacitor 52. The rate of charging of capacitor 52 is dependent upon the resistance of variable resistor 54, so that a positive stepwave voltage will be produced across the capacitor 52 having steps of an amplitude determined by the setting of resistor 54.

The capacitor 52 is connected to the emitter of a unijunction transistor 55 in counter 18. Base $B_2$ of transistor 55 is connected to ground by way of resistor 56, and base $B_1$ is connected to a negative source by way of resistor 57. When the amplitude of the positive stepwave voltage at the emitter of the unijunction transistor reaches the emitter peak point voltage, the transistor will conduct to discharge the capacitor 52 and produce a negative pulse at base $B_2$ and a positive pulse at base $B_1$. The variable resistor 54 is adjusted such that the firing point occurs at the center of the 10 μs. ramp interval.

The negative pulse at base $B_2$ is applied by way of inverter 19 to the multivibrator 11, in order to return this multivibrator to its stable state, thereby preventing the passage of any more pulses through the AND gate 13. Consequently, once the capacitor 52 has been discharged by the unijunction transistor, no more step charges will be applied to it until the start of the next vertical pulse. The positive pulse at base $B_1$ of the unijunction transistor is applied as a trigger pulse to the single-shot multivibrator 21 by way of the RC coupling network 60. The multivibrator 21 is adjusted to provide a gating pulse output sufficiently long that it will coincide only with the desired horizontal pulse. As an example, the multivibrator 21 may provide a gate pulse that has a 68 microsecond duration within a ±5 μs. tolerance.

The output of the multivibrator 21, which is a negative gate at the common collector lead of transistors 62 and 63, is applied to the base of transistor 64 in AND gate 20. The output of emitter follower 14 is applied to the base of the other transistor 65 in AND gate 20. The transistor 64 has a normal forward bias due to the connection of its base to the collector resistor of normally cut-off transistors 62 and 63, and the transistor 65 has a normal forward bias due to the clamp circuit 42. Consequently, the output of AND gate 20 will be a positive pulse at output terminal 66 occurring at the coincidence of the gate output of multivibrator 21 and the desired horizontal pulse. Since the horizontal drive pulses only pass through the emitter follower 14 and AND gate 20, there is a minimum of interference with these pulses, and they are not substantially delayed.

Since the variable desistor 54 controls charging current of capacitor 52, this resistor may be employed as an adjustment to the system to select any desired horizontal pulse. It is also apparent that the circuit of FIG. 3 can be employed if desired to produce an accurate broad vertical pulse having a duration of a predetermined number of lines, since the output of the single shot multivibrator 11 is accudately controlled as a result of the feedback from the counter circuit. This pulse may be made available for external use, for example, at an output terminal 67 connected to the collector of transistor 31. This output may also be employed, if desired, to separately gate a desired number of horizontal drive pulses.

In an actual embodiment of the invention, integrated circuits of the type MW μL 910 were employed for the AND gates 13 and 20, the multivibrator 15, and the multivibrator 21. The emitter followers 10, 12 and 14 employed 2N4122 transistors, the transistors 31 and 32 were of type 2N1307, the inverter 19 employed a 2N1309 transistor, the emitter follower 17 employed an MPS 6521–S, and constant current transistor 51 was a type 2N4122. The unijunction transistor 55 was type TIS 43.

It will be understood, of course, that while the form of the invention herein shown and described constitutes the preferred embodiment of the invention, it is not intended herein to illustrate all of the equivalent forms or ramifications thereof. It will be obvious that modifications may be made without departing from spirit and scope of the invention, and it is aimed in the appended claims to cover all such changes as fall within the true spirit and scope of the invention.

What we claim is:

1. A system for selecting a predetermined pulse occurring with a given number in a pulse train following a given event, comprising a source of said pulse train, means responsive to said event for producing a first pulse having a normal duration greater than the time interval between said event and said predetermined pulse, first AND gate means, means applying said pulse train and said first pulse to said first AND gate means for producing a pulse series of pulses coincident with the pulses of said pulse train during the interval of said first pulse, counting means, means applying said pulse series to said counting means for producing a trigger pulse when said counter has counted a predetermined number of pulses in said pulse series, said number being one less than said given number of said predetermined pulse, means applying said trigger pulse to said means for producing said first pulse for stopping said first pulse before its normal duration, means responsive to said trigger pulse for producing a second pulse, second AND gate means, and means applying said pulse train and second pulse to said second AND gate whereby only said predetermined pulse passes said second AND gate means.

2. The system of claim 1 in which said counter means comprises a capacitor, means for charging said capacitor at a predetermined rate during the occurrence of the pulses of said pulse series, and threshold means connected to said capacitor for producing said trigger pulse when the voltage across said capacitor exceeds a predetermined amplitude.

3. In a television system, a source of vertical pulses, a source of horizontal drive pulses synchronized with said vertical drive pulses, first monostable circuit means for producing a first pulse of a normal duration of a plurality of line periods, means applying said vertical drive pulses to said first monostable circuit means for triggering said first monostable circuit means to produce said first pulse, AND gate means, means applying said horizontal drive pulses and first pulse to said AND gate means for producing a pulse series of pulses coinciding with said horizontal pulses only during the occurrence of said first pulse, counting means, means for applying said pulse series to said counting means for producing a trigger pulse when said counting means has counted a predetermined number of pulses in said pulse series, and means applying said trigger pulse to said monostable circuit means for resetting said monostable circuit means, whereby the duration of said first pulse is less than said normal duration and said AND gate means passes only a predetermined number of horizontal drive pulses for each occurrence of a vertical drive pulse.

4. A television system for selecting a predetermined horizontal drive pulse occurring during a vertical blanking period, comprising a source of vertical drive pulses, a source of horizontal drive pulses synchronized with said vertical drive pulses, a first monostable circuit having a quasi-stable state of a duration exceeding the time between the occurrence of a vertical drive pulse and the said predetermined horizontal pulse, means applying said vertical drive pulses to said first monostable circuit, whereby said first monostable circuit produces first pulses, first AND gate means, means applying said first pulses and said horizontal drive pulses to said first AND gate means to produce a pulse series of pulses coinciding with said horizontal drive pulses only during the occurrence of said first pulse, counter means, applying said pulse series to said counter means for producing a trigger pulse when said counter has counted a predetermined number of pulses of said pulse series, means applying said trigger pulse to said first monostable circuit for resetting said first monostable circuit, second AND gate means, means responsive to said trigger pulse for opening said second AND gate means for a predetermined interval, and means applying said horizontal drive pulses to said second AND gate means, whereby only said predetermined pulse passes said second AND gate means.

5. The system of claim 4 in which said counter means comprises a capacitor, constant current generator means for charging said capacitor during the occurrence of the pulses of said pulse series, and threshold means connected to said capacitor for producing said trigger pulse when the voltage across said capacitor exceeds a predetermined amplitude.

6. The system of claim 5 in which said constant current generator means comprises a transistor, a source of operating potential, means connecting the base of said transistor and one electrode of said capacitor to one terminal of said source of potential, means connecting the collector of said transistor to the other electrode of said capacitor, a resistive charging circuit for said capacitor connected between the emitter of said transistor and the other terminal of said source, and means applying said pulse series to said emitter.

7. The system of claim 5 in which said threshold means comprises a unijunction transistor having its emitter connected to said capacitor, a source of operating voltage having first and second terminals, resistive means connecting the base circuit of said transistor between said first and second terminals, and means for deriving said trigger pulse from the base circuit of said transistor.

8. The system of claim 4 wherein said means applying said pulse series to said counter means comprise pulse regenerating means for regenerating said pulse series to a series of pulses of a constant predetermined width.

9. The system of claim 4 wherein said means responsive to said trigger pulses for opening said second AND gate comprises a monostable circuit responsive to said trigger pulses for generating a gate pulse having a duration slightly greater than a line period, and means applying said gate pulse to said second AND gate means.

References Cited

UNITED STATES PATENTS

| | | | |
|---|---|---|---|
| 3,004,241 | 10/1961 | Konig | 328—110 |
| 3,423,525 | 1/1969 | Baun. | |

OTHER REFERENCES

Journal of the SMPTE, vol. 75, February 1966, pp. 94–98.

RICHARD MURRAY, Primary Examiner

W. H. BRITTON, Assistant Examiner

U.S. Cl. X.R.

178—69.5; 324—121; 328—109